United States Patent
Yang (10) Patent No.: US 12,314,740 B2
(45) Date of Patent: May 27, 2025

(54) METHOD AND APPARATUS FOR PROVIDING SERVICES IN VIRTUAL DESKTOP ENVIRONMENT

(71) Applicant: INJE UNIVERSITY INDUSTRY-ACADEMIC COOPERATION FOUNDATION, Gimhae-si (KR)

(72) Inventor: Jinhong Yang, Daejeon (KR)

(73) Assignee: INJE UNIVERSITY INDUSTRY-ACADEMIC COOPERATION FOUNDATION, Gimbae-si (KR)

( * ) Notice: Subject to any disclaimer, the term of this patent is extended or adjusted under 35 U.S.C. 154(b) by 471 days.

(21) Appl. No.: 17/587,034

(22) Filed: Jan. 28, 2022

(65) Prior Publication Data

US 2023/0062596 A1    Mar. 2, 2023

Related U.S. Application Data

(60) Provisional application No. 63/235,588, filed on Aug. 20, 2021.

(51) Int. Cl.
| | |
|---|---|
| G06F 15/16 | (2006.01) |
| G06F 9/451 | (2018.01) |
| G06F 21/10 | (2013.01) |
| H04L 9/40 | (2022.01) |
| H04L 67/10 | (2022.01) |

(52) U.S. Cl.
CPC ............ G06F 9/452 (2018.02); G06F 21/105 (2013.01); H04L 63/08 (2013.01); H04L 67/10 (2013.01); *G06F 21/1077* (2023.08)

(58) Field of Classification Search
CPC .... G06F 9/452; G06F 21/105; G06F 21/1077; H04L 63/08; H04L 67/10
See application file for complete search history.

(56) References Cited

U.S. PATENT DOCUMENTS

| | | | |
|---|---|---|---|
| 2016/0132214 A1* | 5/2016 | Koushik | G06F 8/61 |
| | | | 715/741 |
| 2016/0378535 A1* | 12/2016 | Oh | G06F 9/4451 |
| | | | 718/1 |

* cited by examiner

*Primary Examiner* — Normin Abedin
(74) *Attorney, Agent, or Firm* — Studebaker Brackett PLLC (57) ABSTRACT

Disclosed are a method and an apparatus for providing services in a virtual desktop environment. A method for providing services in a virtual desktop environment according to an exemplary embodiment of the present invention may include: (a) receiving a VDI service request for a virtual desktop infrastructure (VDI); (b) determining component information of a basic VDI image in response to the VDI service request; (c) receiving external service related information associated with the basic VDI image from a content management system (CMS) server; and (d) generating a final VDI image for the VDI service by reflecting the component information and the external service related information to the basic VDI image.

8 Claims, 6 Drawing Sheets

METHOD AND APPARATUS FOR PROVIDING SERVICES IN VIRTUAL DESKTOP ENVIRONMENT

CROSS-REFERENCE TO RELATED APPLICATIONS

This application claims the priority of U.S. Provisional Application No. 63/235,588 filed on Aug. 20, 2021, the disclosure of which is incorporated herein by reference.

BACKGROUND OF THE INVENTION

Field of the Invention

The present invention relates to a method and an apparatus for providing services in a virtual desktop environment, and more particularly, to a method and an apparatus for providing services in a virtual desktop environment by linkage of a virtual desktop infrastructure (VDI) and a content management system (CMS).

Description of the Related Art

A virtual desktop infrastructure (VDI) means a technique in a form of allowing a user to perform an operation in a virtual desktop by building a virtual desktop environment on a server connected via a network and accessing a server through a thin client or zero client consisting of only required devices of an input means such as a keyboard, a mouse, etc., a display, and the like.

The VDI technique may allow the user to use the same desktop environment regardless of a physical location and has an advantage even in security and the like, and thus the use thereof has been gradually increased based on a work environment of companies and the like.

However, studies on provision of services in conjunction with this VDI environment and external services are insufficient.

SUMMARY OF THE INVENTION

The present invention is contrived to solve the aforementioned problems, and has been made in an effort to provide a method and an apparatus for providing services in a virtual desktop environment.

The present invention has also been made in an effort to provide a method and an apparatus for making components of a corresponding image into metadata when generating a VDI image and updating specific additional requirements in association with CMS based thereon.

The present invention has also been made in an effort to provide a method and an apparatus for performing a reuse function of a VDI instance applied with a license to use effectively a license as much as possible.

Other objects of the present invention are not limited to the objects described above, and other objects, which are not mentioned above, will be apparent to those skilled in the art from the following description.

In order to achieve the objects, an exemplary embodiment of the present invention provides a method for providing services in a virtual desktop environment, which may include: (a) receiving a VDI service request for a virtual desktop infrastructure (VDI); (b) determining component information of a basic VDI image in response to the VDI service request; (c) receiving external service related information associated with the basic VDI image from a content management system (CMS) server; and (d) generating a final VDI image for the VDI service by reflecting the component information and the external service related information to the basic VDI image.

In the exemplary embodiment, the method for providing services in a virtual desktop environment may further include: after step (a), performing a user login for a VDI platform for the VDI service in response to the VDI service request; loading VDI setting related information predetermined by a user in response to the user login; and loading external service related information according to the VDI setting related information.

In the exemplary embodiment, the method for providing services in a virtual desktop environment may further include: after step (a), performing an authentication of the user for an external service by using service access related information included in the external service related information.

In the exemplary embodiment, the method for providing services in a virtual desktop environment may further include: after step (d), generating a VDI instance for the VDI service by using the final VDI image.

In the exemplary embodiment, the method for providing services in a virtual desktop environment may further include: after step (b), generating a VDI instance in which a common utilization instance flag for the external service is set when license common utilization for the external service is possible; and waiting for a VDI service access of a user terminal by adding the VDI instance to a common utilization instance pool.

In the exemplary embodiment, the method for providing services in a virtual desktop environment may further include: after the waiting, identifying that an instance flag of the VDI instance is the common utilization instance flag as the VDI service access of the user terminal is terminated; and returning the VDI instance to the common utilization instance pool according to the identification.

In the exemplary embodiment, the method for providing services in a virtual desktop environment may further include: after the returning, determining whether a license valid time of the VDI instance is smaller than a threshold; when the license valid time of the VDI instance is larger than the threshold, waiting for the VDI service access of the user terminal by adding the VDI instance to the common utilization instance pool; and when the license valid time of the VDI instance is smaller than the threshold, terminating the VDI instance by shutting the VDI instance from the common utilization instance pool.

Another exemplary embodiment of the present invention provides an apparatus for providing services in a virtual desktop environment, which may include: a communication unit receiving a VDI service request for a virtual desktop infrastructure (VDI); and a control unit determining component information of a basic VDI image in response to the VDI service request, in which the communication unit may receive external service related information associated with the basic VDI image from a content management system (CMS) server, and the control unit may generate a final VDI image for the VDI service by reflecting the component information and the external service related information to the basic VDI image.

In the exemplary embodiment, the control unit may perform a user login for a VDI platform for the VDI service in response to the VDI service request, load VDI setting related information predetermined by a user in response to the user login, and load external service related information according to the VDI setting related information.

In the exemplary embodiment, the control unit may perform an authentication of the user for an external service by using service access related information included in the external service related information.

In the exemplary embodiment, the control unit may generate a VDI instance for the VDI service by using the final VDI image.

In the exemplary embodiment, the control unit may generate a VDI instance in which a common utilization instance flag for the external service is set when license common utilization for the external service is possible, and wait for a VDI service access of a user terminal by adding the VDI instance to a common utilization instance pool.

In the exemplary embodiment, the control unit may identify that an instance flag of the VDI instance is the common utilization instance flag as the VDI service access of the user terminal is terminated, and return the VDI instance to the common utilization instance pool according to the identification.

In the exemplary embodiment, the control unit may determine whether a license valid time of the VDI instance is smaller than a threshold, wait for the VDI service access of the user terminal by adding the VDI instance to the common utilization instance pool when the license valid time of the VDI instance is larger than the threshold, and terminate the VDI instance by shutting the VDI instance from the common utilization instance pool when the license valid time of the VDI instance is smaller than the threshold.

Specific matters for achieving the above objects will be clearly referred to in detail to be described in detail with the accompanying drawings.

However, the present invention is not limited to an exemplary embodiment disclosed below but may be implemented in various different shapes and the present invention just completes a disclosure of the present invention and is provided to completely inform a scope of the present invention to those skilled in the art (hereinafter, a "conventional technical expert").

According to an exemplary embodiment of the present invention, it is possible to easily manage a system environment with characteristics such as an individual curriculum, a professor, and the like.

Further, it is possible to provide a customized class environment associated with a class program, and the like in a pre-defined form and trade the customized class environment through a market place and the like.

The effects of the present invention are not limited to the aforementioned effects, and provisional effects to be expected by the technical features of the present invention will be clearly understood from the following description.

DETAILED DESCRIPTION OF THE PREFERRED EMBODIMENT

The present invention may have various modifications and various embodiments and specific embodiments will be illustrated in the drawings and described in detail.

Various features of the present invention disclosed in claims will be able to be better appreciated by considering drawings and Detailed Description. An apparatus, a method, a preparation, and various embodiments disclosed in the specification are provided for an illustrative purpose. Features on a structure and a function disclosed are used to allow those skilled in the art to specifically carry out various embodiments, and not used to limit the scope of the present invention. Disclosed terms and sentences are used for describing various features of the present invention disclosed to be easily appreciated, and do not limit the scope of the present invention.

In describing the present invention, a detailed description of related known technologies will be omitted if it is determined that they unnecessarily make the gist of the present invention unclear.

Hereinafter, a method and an apparatus for providing services in a virtual desktop environment according to an exemplary embodiment of the present invention will be described.

Figure 1:
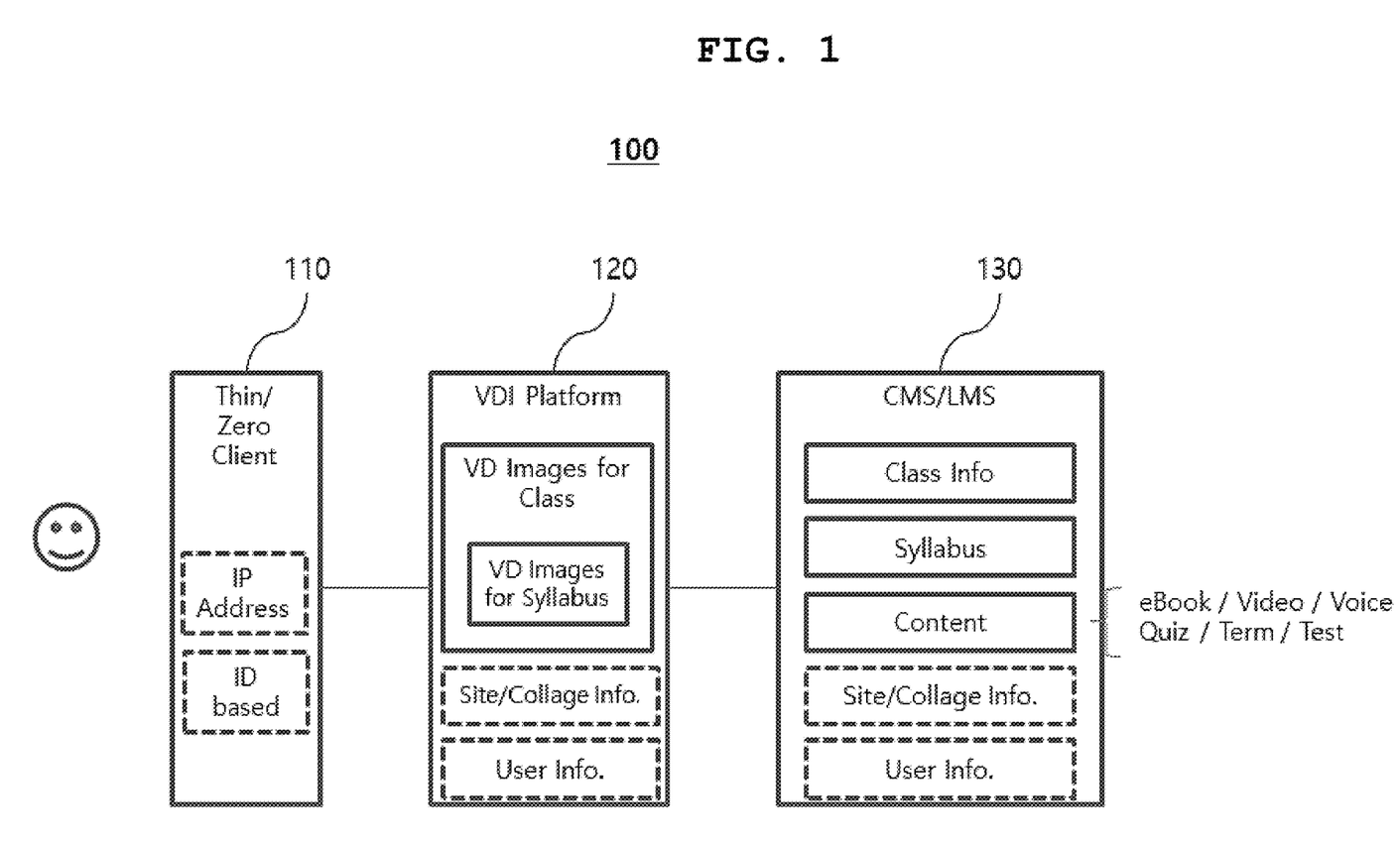
FIG. 1 is a diagram illustrating a virtual desktop system according to an exemplary embodiment of the present invention.

FIG. 1 is a diagram illustrating a virtual desktop system 100 according to an exemplary embodiment of the present invention.

Referring to FIG. 1, a virtual desktop system 100 may include a user terminal 110, a virtual desktop infrastructure (VDI) platform server 120, and a content management system (CMS) server 130.

In the virtual desktop system 100, an association between VDI and CMS may be performed. In an exemplary embodiment, the CMS server 130 may include a learning management system (LMS).

For example, a VDI image based on a class or a class plan (weekly, etc.) received from the CMS server 120 is prepared in advance or in real time, and the user terminal 110 may use the VDI image in connection with the VDI platform server via a thin/zero client, etc.

The VDI platform server 120 may manage related licenses and user information based on the contract with used places (e.g., schools, institutions, universities, etc.).

The user terminal 110 may authenticate a user with an IP-based or MAC-based authentication, and an identification value of a unique service user such as a user ID/school number.

In an exemplary embodiment, the VDI image may be referred to as a virtual desktop image, a virtual machine image, or a term having an equivalent technical meaning.

In an exemplary embodiment, the VDI image may have a disk format or container format.

The disk format may be configured in the form of a virtual drive, and the container format may have a form of compressing virtual disk information.

The component information of the VDI image may be configured in the form of metadata.

In an exemplary embodiment, the component information of the VDI image refers to metadata associated with the image information of the virtual machine, and may include general image properties information.

In an exemplary embodiment, the component information of the VDI image may include information related to execution of the VDI image, such as the following Table 1.

TABLE 1

| Type | Contents |
| --- | --- |
| Architecture of operating system | x86_64(64-bit extension of IA-32), arm71(ARM Cortex-A7 MPCore), mips64(MIPS 64-bit RISC (Big Endian)), pcc64(PowerPC 64-bit), etc. |
| Hypervisor type | hyperv, ironic, lxc, qemu, uml, vmware, xen, etc. |
| UUID of Instance | Unique address value |
| Image Configuration Drive Information | mandatory, optional, etc. |
| Kernel id | Unique ID Information of Kernel |
| OS Admin User | Admin user information of OS (root information) |
| OS configuration information | arch (arch linux), centos (centOS), freebsd (freeBSD), ubuntu (Ubuntu), windows (Microsoft windows) |
| OS Version | OS related version information |
| OS secure boot | secure boot related information, required or disable/optional |
| OS Shutdown Timeout | OS Shutdown Timeout information |
| RAM Disk ID | ID information for RAM Disk use |
| HW firmware type | Device firmware information in boot environment |
| Etc. | Etc. |

Further, in an exemplary embodiment, external service related information associated with the VDI image may consist of metadata.

In an exemplary embodiment, external service related information may include additional information associated with content-related information such as training and practice.

For example, the external service related information may include at least one of content-related information, user information, service participation role information, service software configuration information, and service access related information.

In an exemplary embodiment, the content related information may include information related to training and practice. For example, the content-related information may include information that may configure and manage a series of consecutive actions or section/order-specific data on a general LMS or CMS.

In an exemplary embodiment, the content-related information may be used to edit or pre-configure content information to be initially configured when creating a virtual desktop through the corresponding function.

The user information may include information according to the user role on the LMS or CMS and information necessary for system management. For example, the user information may include education and contents related user information such as students, teachers, assistants, teaching assistants, and administrative information such as administrators (Admin), managers, and developers.

The user information may be used to differentiate a role function of configuration information (dP: program function activation, user group creation, etc.) on the VDI service of the user.

In addition, user information may be used to manage (store and restore) separately user use recording information and may be used to implement services such as a task submission.

Service participation role information may include registration information related to a lecture or a practice. For example, the service participation role information may include information on a participation role of the user in the corresponding lecture or practice when using the VDI service. For example, the service participation role information may be used for determining a role such as participation of the user as a professor or a student.

Service software configuration information may include software (SW) installation list information for an external service to be provided to the user.

In an exemplary embodiment, the service software configuration information may be used for managing characteristics for each component of software installed by using dependency information or package information when multiple installation items are designated.

The dependency information may be used for managing dependency of the software in a tree form.

In an exemplary embodiment, the package information may include information shown in <Table 2> below.

TABLE 2

| Type | Contents |
| --- | --- |
| Name | Unique package name |
| Version | Package version |
| Description | Package description |
| Keywords | Package keyword |
| Homepage | Related homepage |
| License | License |
| Files | Array of files included in package |

In an exemplary embodiment, License may designate how an authority is acquired when using the package with license related information or license information related to forbidden issues (e.g., "license". "BSD-3-Clause", "license": "SEE LICENSE IN<filename>||<url>").

In an exemplary embodiment, in the case of License, a separate form such as Site License or a key based central management form may provide information for interworking with a separate system, and in this case, a VDI manager may record and manage the license in a separate information form.

Files may represent an array of files included in the package, and may be expressed in the form of JSON, etc.

In an exemplary embodiment, the service access related information may include information for association with the VDI service and the external service. For example, the service access related information may include an authentication method and an authentication key, a token, etc.

The service access related information may be authorized in advance by using separate authentication information when being requested by a virtual desktop for each user or after an instance is generated, the corresponding information may be stored and used in the component information.

According to the present invention, it is possible to make components of a corresponding image into metadata when generating a VDI image and update specific additional requirements in association with CMS based thereon. Through this, it is possible to provide a VDI service suitable for a specific lecture plan and a class.

Further, according to the present invention, it is possible to easily manage a system environment with characteristics such as an individual curriculum, a professor, and the like.

Further, it is possible to provide a customized class environment associated with a class program, and the like in a pre-defined form and trade the customized class environment through a market place and the like.

In an exemplary embodiment, a specific publisher may provide a related VDI based practice environment while launching a front-end web development book.

In the related art, an individual learner should set a development environment and perform a test, but according to the present invention, may be provided with an environment in which the individual learner may easily practice contents of a corresponding textbook by using a VDI service environment which is included when purchasing the book or separately paid.

In an exemplary embodiment, in the case of college lectures, when a computer practice centered lecture is conducted, the corresponding practice environment is provided according to a curriculum and a syllabus for each week to reduce a burden on a class preparation of the professor and the learner.

That is, it is possible to provide an effective learning method through a fast practice environment configuration.

Further, according to the present invention, when a virtual desktop environment is widely utilized in an environment such as education, a service of a form associated with an external content management system (CMS) may be provided.

Further, according to the present invention, through the association with the external CMS, various contents including a practice, a task, and the like of a corresponding week or process based on the curriculum are provided from the virtual desktop environment in advance, which are conducted to provide convenience of the user and convenience of content supply.

Figure 2:
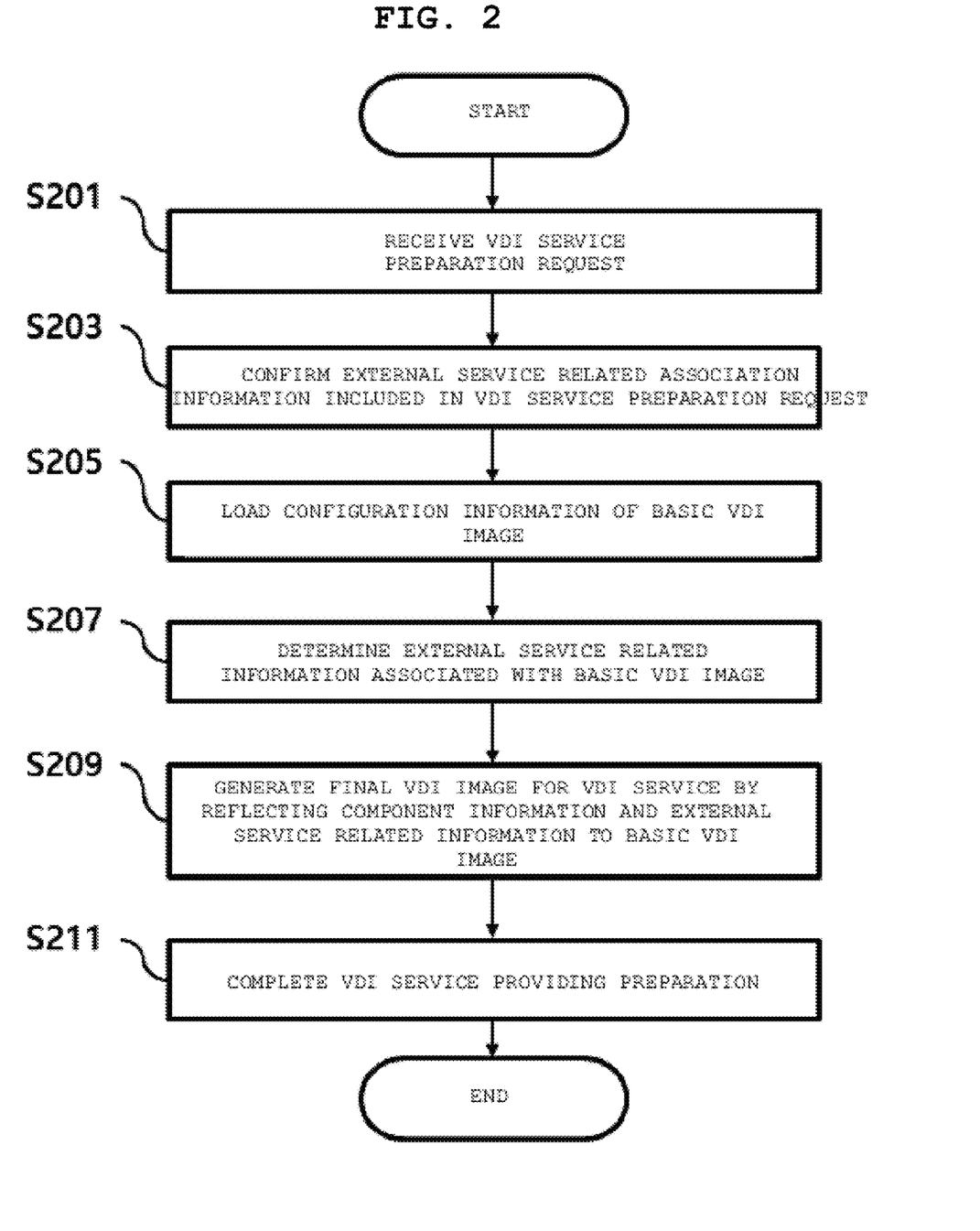
FIG. 2 is a diagram illustrating a method for generating a VDI image associated with an external service according to an exemplary embodiment of the present invention.

FIG. 2 is a diagram illustrating a method for generating a VDI image associated with an external service according to an exemplary embodiment of the present invention. In an exemplary embodiment, each step of FIG. 2 may be performed by the VDI platform server 120 of FIG. 1.

Referring to FIG. 2, step S201 is a step of receiving a VDI service preparation request. In an exemplary embodiment the VDI service preparation request may be generated when the service associated with the external service is requested. Further, in an exemplary embodiment, the VDI service preparation request may be generated in a batch form at a specific time through schedule information registered in advance, etc.

Step S203 is a step of confirming association information related to the external service included in the VDI service preparation request. In an exemplary embodiment, the VDI service preparation request may include CMS related authentication information.

Step S205 is a step of loading component information of a basic VDI image.

Step S207 is a step of determining external service related information associated with the basic VDI image. That is, additional content or software information required in the basic VDI image may be recorded in a separate metadata file.

In an exemplary embodiment, requirements on the external service may be confirmed. For example, the requirements may include at least one of a short cut, a drive connection, and a term connection (e.g., Chat/Collaboration solution).

Step S209 is a step of generating a final VDI image by reflecting the component information and the external service related information to the basic VDI image.

In an exemplary embodiment, a procedure of confirming the requirements may be performed in connection with the dependency information and the license information by using the external service related information of the final VDI image.

In an exemplary embodiment, when multiple users perform a specific lecture, the external service related information may be stored in a separate VDI image in order to shorten a load time.

Step S211 is a step of completing a VDI service providing preparation. That is, finally, a VDI service preparation associated with external contents may be completed.

Figure 3:
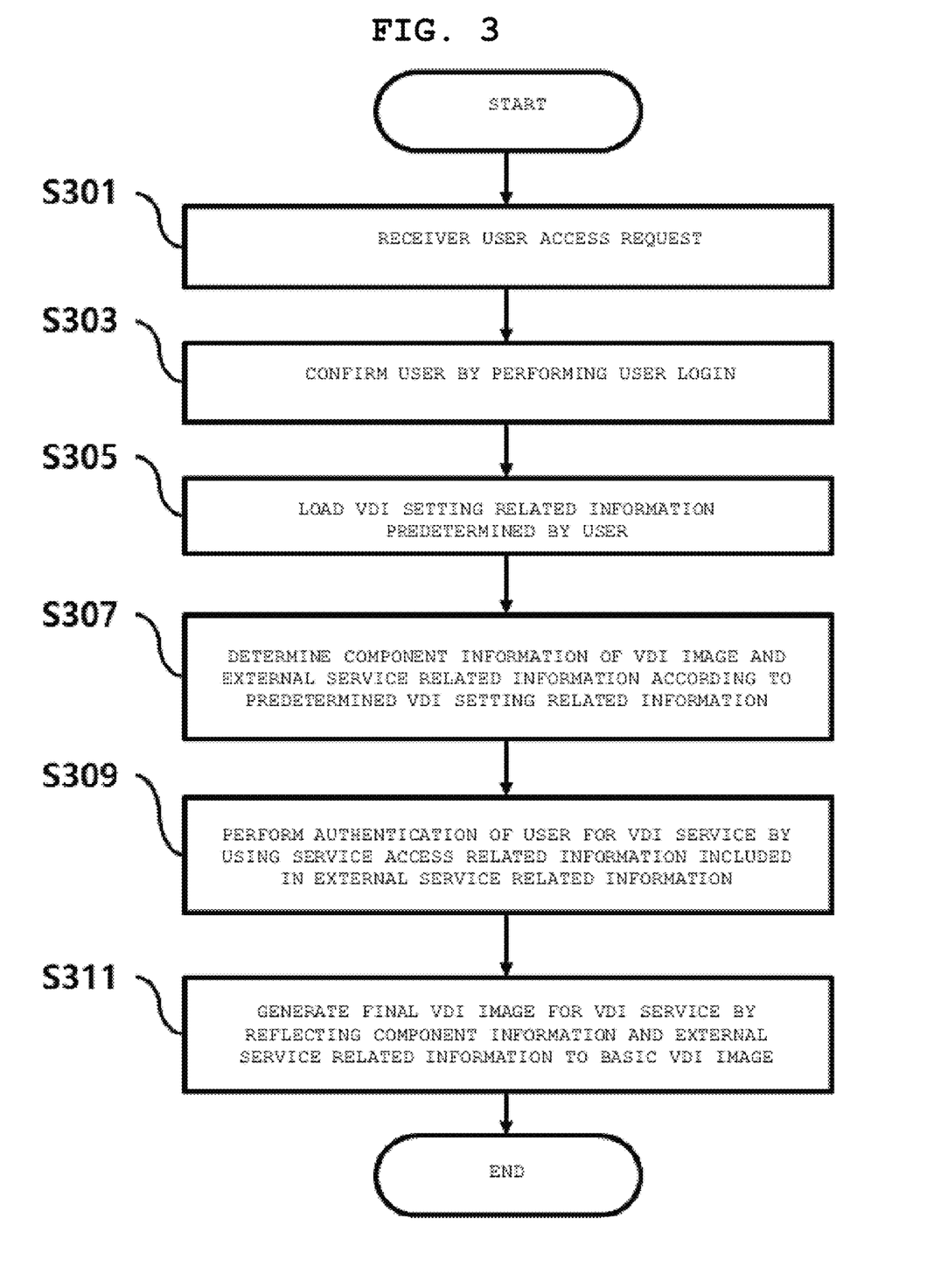
FIG. 3 is a diagram illustrating a method for processing a user request associated with an external service according to an exemplary embodiment of the present invention.

FIG. 3 is a diagram illustrating a method for processing a user request associated with an external service according to an exemplary embodiment of the present invention. In an exemplary embodiment, each step of FIG. 3 may be performed by the VDI platform server 120 of FIG. 1.

Referring to FIG. 3, step S301 is a step of receiving a user access request.

Step S303 is a step of confirming the user by performing a user login.

Step S305 is a step of loading VDI setting related information predetermined by the user.

Step S307 is a step of determining the component information of the basic VDI image and the external service related information according to the predetermined VDI setting related information.

The VDI setting related information predetermined by the user and the component information of the VDI image are compared with each other to determine component information and external service related information corresponding to the user.

Step S309 is a step of performing an authentication of the user for the external service by using the service access related information included in the external service related information.

In an exemplary embodiment, when the user authentication is required among the external service related information, an authentication association may be conducted through a procedure such as generation of an authentication token included in the service access related information, etc.

In n embodiment, the external service should be able to be automatically associated based on the VDI setting related information predetermined by the user on the VDI service.

That is, when the user installs or connects the VDI service on the VDI, a VDI platform server 120 should be able to determine the VDI service to be registered in the VDI setting related information.

In this case, a procedure of obtaining a user consent, and a user setting function may be provided for a loading condition such as automatic loading by selection of the user or loading after a selective query.

To this end, the VDI platform server 120 may provide services which the user may associate in advance in an application form.

In the case of the corresponding application, configuration information for a prior association may be examined by a VDI service provider, and then registered.

That is, upon the login of the user, loading the external service to the VDI service and a connection through authentication may be provided based on the VDI setting related information which the user sets in advance.

For example, an external storage service such as a Cloud storage service, etc., SaaS based service subscription information, S/W and application license information, favorites user service usage history information, etc., may be used.

In an exemplary embodiment, when the external service authenticated by the VDI platform server 120 is used, the authentication may be performed.

In an exemplary embodiment, in the case of the user authentication, a user direct authentication through a user query may be performed.

Further, the authentication may be performed based on an authentication key granted to the VDI service by the user.

In an exemplary embodiment, in the case of a service provider authentication, the authentication for the external service may be performed based on a contract which an institution to which the user belongs or a school, an enterprise, etc., providing the VD service make with the VD service provider in advance.

Step S311 is a step of generating the final VDI image by reflecting the component information and the external service related information to the basic VDI image. That is, an updated VDI image may be executed.

In an exemplary embodiment, registration for a VDI platform of the external service may be performed.

The CMS server 130 which is an external service provider may perform a separate registration procedure from the VDI platform server 120 in order to provide the service on the VDI platform.

The VDI platform server 120 may analyze system matters such as software dependency and a business contract relationship for an external service examination request of the CMS server 130, and then select a service to be applied and a user object.

In an exemplary embodiment, the license for the external service may be utilized on the VDI.

When there is the license of the external service or the software, the corresponding license may be set various forms such as a predetermined period criterion such as permanent or day/month.

In the case of the collage, the corresponding license may be supplied by dividing all collages into a level such as a site or an individual collage.

When the license is provided by the period criterion, a reuse function of a VDI instance to which the license is applied may be provided in order to effectively utilize the license to the maximum in order to effectively use the license when using the VDI service.

To this end, the VDI platform server 120 may connect an access of the user terminal 110 based on a time when an initial license is used, put the instance pool in a common utilization instance pool again when the access of the user terminal 110 which is being used is terminated, and connect a license which is not expired when an access of a new user terminal is requested.

In order to effective perform this, a license based VDI service may be provided in association with classroom operation information, lecture opening information, etc., of the collage.

In an exemplary embodiment, the VDI platform server 120 may designate a minimum use time for each license. For example, in the case of the practice, the minimum use time may be a form such as a minimum of 1 hour, etc., or a minimum use time such as 2 hours, 3 hours, etc., may be designated according to a lecture time.

Figure 4:
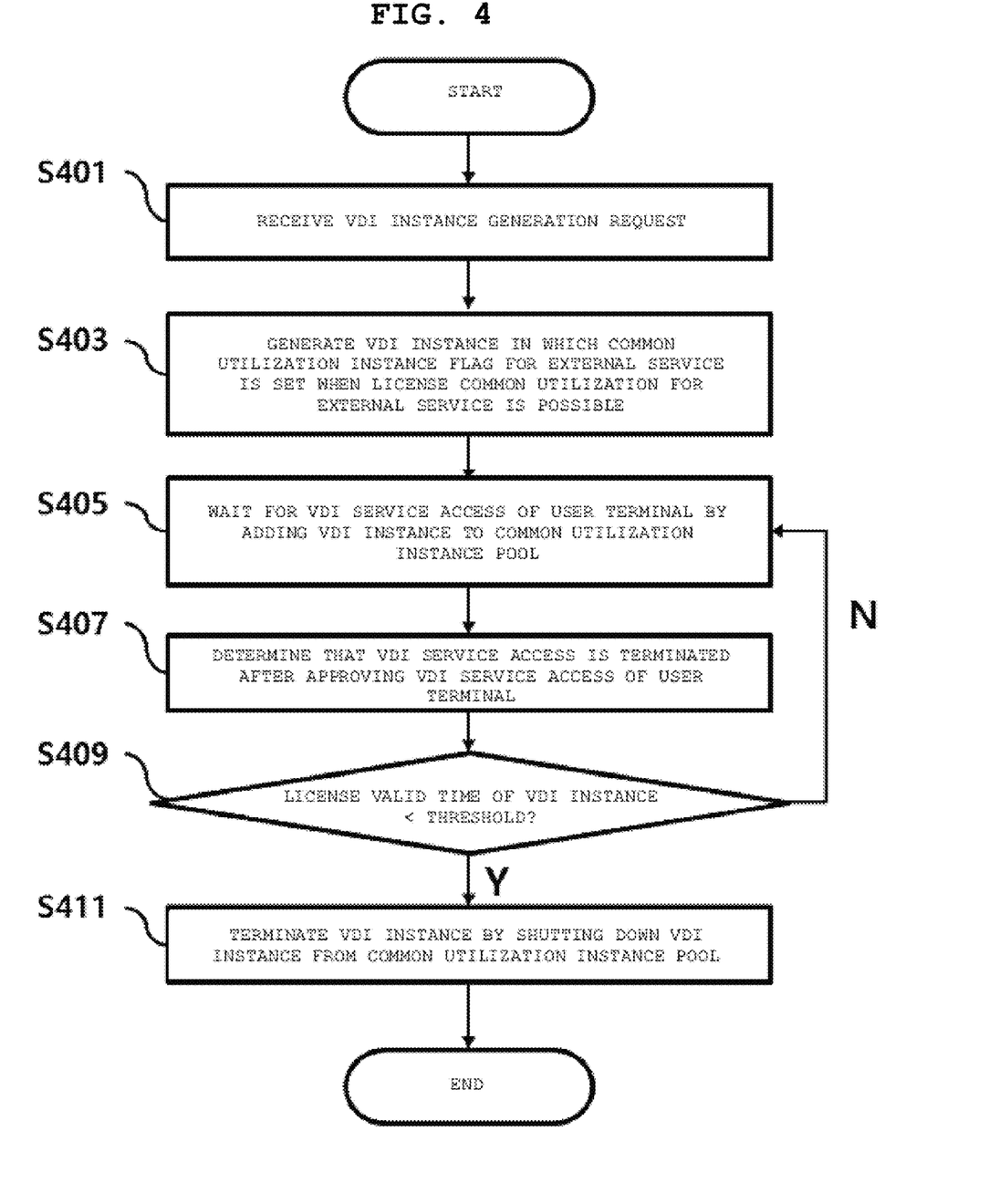
FIG. 4 is a diagram illustrating a method for managing a common use instance for a license common use according to an exemplary embodiment of the present invention.

FIG. 4 is a diagram illustrating a method for managing a common use instance for a license common use according to an exemplary embodiment of the present invention. In an exemplary embodiment, each step of FIG. 4 may be performed by the VDI platform server 120 of FIG. 1.

Referring to FIG. 4, step S401 is a step of receiving a VDI instance generation request.

Step S403 is a step of generating a VDI instance in which a common utilization instance flag for the external service is set when license common utilization for the external service is possible.

When the license is used based on a predetermined period, license terms are determined to separately record a VDI instance in which a license which may be commonly utilized is executed in a common utilization instance pool.

Step S405 is a step of waiting for the VDI service access of the user terminal 110 by adding the VDI instance to the common utilization instance pool.

Step S407 is a step of determining that the VDI service access is terminated after approving the VDI service access of the user terminal 110.

After the access of the user terminal 110 is terminated, an instance flag may be confirmed before instance shutdown according to a lifecycle of the VDI instance.

Step S409 is a step of determining whether a license valid time of the VDI instance is smaller than a threshold. Here, the license valid time may mean an utilizable time of the license.

In an exemplary embodiment, when the license valid time of the VDI instance is not smaller than the threshold, the process proceeds to step S405 and the VDI instance is added to the common utilization instance pool again to wait for the VDI service access of the user terminal.

In an exemplary embodiment, when the license valid time of the VDI instance is smaller than the threshold, the process proceeds to step S411 to terminate the VDI instance.

That is, when the lifecycle of the license ends or when a minimum requirement time is not satisfied, the license may be discarded.

Step S411 is a step of terminating the VDI instance by shutting down the VDI instance from the common utilization instance pool.

Figure 5:
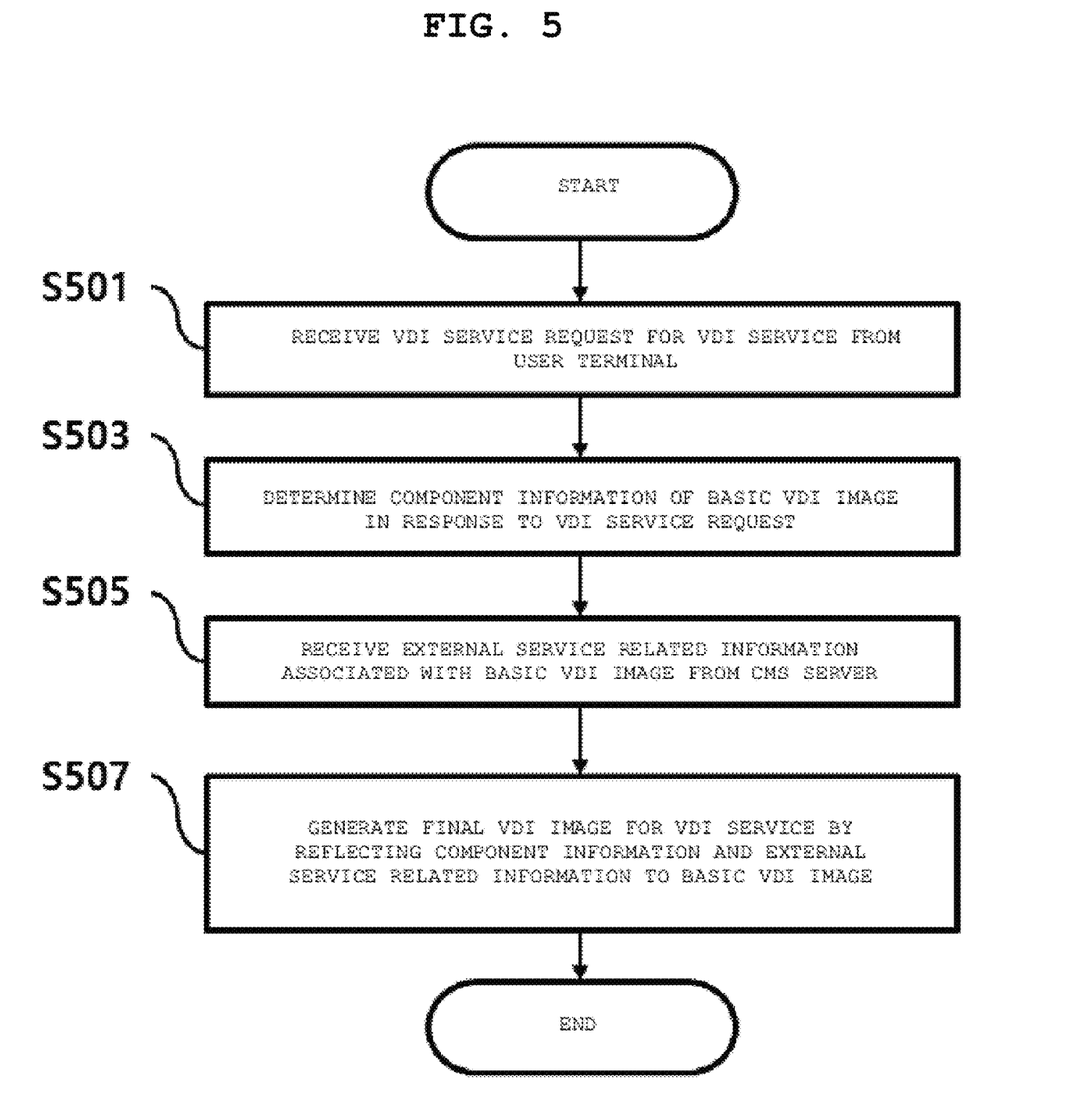
FIG. 5 is a diagram illustrating a method for providing services in a virtual desktop environment according to an exemplary embodiment of the present invention.

FIG. 5 is a diagram illustrating a method for providing services in a virtual desktop environment according to an exemplary embodiment of the present invention. In an exemplary embodiment, each step of FIG. 5 may be performed by the VDI platform server 120 of FIG. 1.

Referring to FIG. 5, step S501 is a step of receiving a VDI service request for a virtual desktop infrastructure (VDI) service.

In an exemplary embodiment, the VDI service request may include at least one of the VDI service preparation request, the user access request, and the VDI instance generation request.

Step S503 is a step of determining the component information of the basic VDI image in response to the VDI service request.

In an exemplary embodiment, the component information of the basic VDI image may include image characteristic information related to execution of the VDI image.

Step S505 is a step of receiving the external service related information associated with the basic VDI image from the content management system (CMS) server 130.

In an exemplary embodiment, the external service related information may include at least one of content-related information, user information, service participation role information, service software configuration information, and service access related information.

In an exemplary embodiment, after step S501, a user login for the VDI platform for the VDI service may be performed in response to the VDI service request, and the VDI setting related information may be loaded in response to the user login, and the external service related information may be loaded according to the VDI setting related information.

That is, only user customized external service related information corresponding to the VDI setting related information predetermined by the user may be loaded.

In an exemplary embodiment, a user setting function for a loading condition of the VDI setting related information predetermined by the user may be provided to the user terminal 110. For example, the loading condition may include automatic loading of the VDI setting related information predetermined by the user or loading after a selective query for the user.

That is, the user setting function may be provided to the user terminal 110 so that one of the automatic loading or the loading after the selective query may be selected by an input by the user through the user terminal 110.

In an exemplary embodiment, after step S501, the authentication of the user for the external service may be performed by using the service access related information included in the external service related information.

In an exemplary embodiment, after step S503, when the license common utilization for the external service is possible, the VDI instance is generated in which the common utilization instance flag for the external service is set and the VDI instance is added to the common utilization instance pool to wait for the VDI service access of the user terminal 110.

In an exemplary embodiment, after the waiting, as the VDI service access of the user terminal is terminated, it may be identified that the instance flag of the VDI instance is the common utilization instance flag and the VDI instance may be returned to the common utilization instance pool according to the identification.

In an exemplary embodiment, after the returning step, it may be determined whether the license valid time of the VDI instance is smaller than the threshold.

In an exemplary embodiment, the utilizable time of the license is determined, and then when the license is utilizable (i.e., when there is a spare time), the corresponding VDI instance may be returned to the common utilization instance pool again.

In an exemplary embodiment, in the case of the returned VDI instance, deletion of the user usage information and personal information processing may be performed.

When the license valid time of the VDI instance is larger than the threshold, it is possible to wait for the VDI service access of the user terminal 110 by adding the VDI instance to the common utilization instance pool.

When the VDI service access waits, a VDI service request for another user terminal by another user may be received and the VDI service may be provided to the corresponding user terminal for a residual license valid time.

In this case, according to the VDI setting related information predetermined by each user, an access priority of each user terminal for the residual license valid time may be determined, and the VDI service may be provided according to the determined access priority.

When the license valid time of the VDI instance is smaller than the threshold, the VDI instance may be terminated by shutting down the VDI instance from the common utilization instance pool.

Step S307 is a step of generating the final VDI image by reflecting the component information and the external service related information to the basic VDI image.

In an exemplary embodiment, after step S507, the VDI instance for the VDI service may be generated by using the final VDI image. In an exemplary embodiment, the VDI service may be provided to the user terminal 110 by executing the VDI instance.

Figure 6:
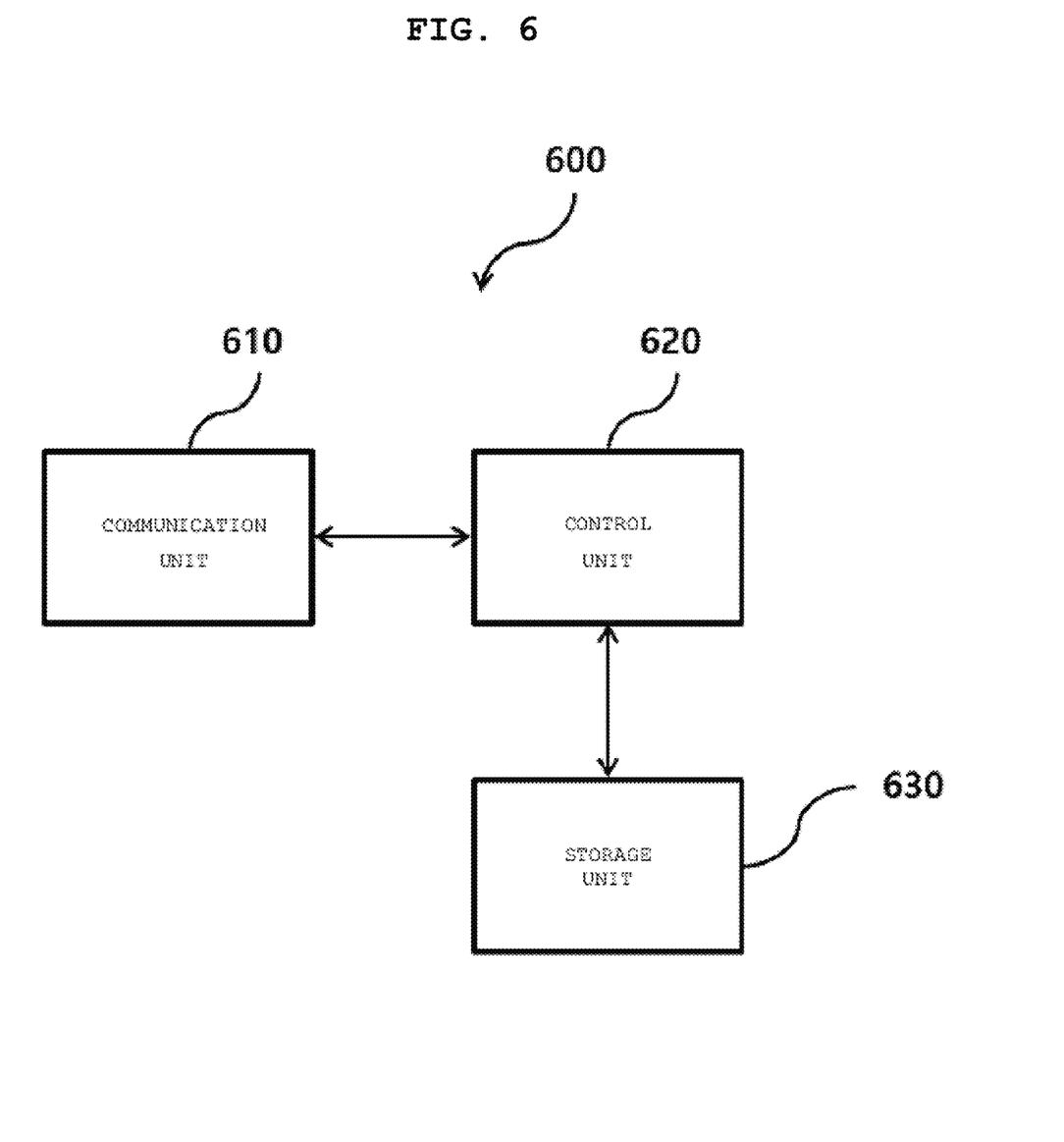
FIG. 6 is a diagram illustrating a functional configuration of an apparatus for providing services in a virtual desktop environment according to an exemplary embodiment of the present invention.

FIG. 6 is a diagram illustrating a functional configuration of an apparatus 600 for providing services in a virtual desktop environment according to an exemplary embodiment of the present invention. In an exemplary embodiment, the service providing apparatus 600 of FIG. 6 may include the VDI platform server 120 of FIG. 1.

Referring to FIG. 6, the service providing apparatus 600 may include a communication unit 610, a control unit 620, and a storage unit 630.

The communication unit 610 may receive the VDI service request for the virtual desktop infrastructure (VDI) service.

In an exemplary embodiment, the communication unit 610 may include at least one of a wired communication module and a wireless communication module. The entirety or a part of the communication unit 610 may be referred to as a 'transmission unit', a 'reception unit', or a 'transceiver'.

The control unit 620 may determine the component information of the basic VDI image in response to the VDI service request.

In an exemplary embodiment, the control unit 620 may include at least one processor or micro processor, or may be a part of the processor. Further, the control unit 620 may be referred to as a communication processor (CP). The control unit 620 may control an operation of the service providing apparatus 600 according to various embodiments of the present invention.

In an exemplary embodiment, the control unit 620 may separately manage the lifecycle of the VDI instance to which the license is applied in order to reduce license cost.

In an exemplary embodiment, the control unit 620 may include a license controller module, a license manager module, and a license lifecycle manager module.

The license controller module may manage license information of a supplier and a service user, and institutions for the VDI service.

The license management module may manage individual license information.

The license lifecycle management module may determine whether the license is activated when executing the VDI instance, and when a specific license is activated, the license lifecycle management module may register and manage the specific license. To this end, the license lifecycle management module may determine license application and activation states in mutual association with the license management module.

In an exemplary embodiment, the communication unit 610 may receive the external service related information associated with the basic VDI image from the content management system (CMS) server 130.

In an exemplary embodiment, the control unit 620 may generate the final VDI image for the VDI service by reflecting the component information and the external service related information to the basic VDI image.

The storage unit 630 may store the VDI image, the component information, and the external service related information.

In an exemplary embodiment, the storage unit 630 may be configured by a volatile memory, a non-volatile memory, or a combination of the volatile memory and the non-volatile memory. In addition, the storage unit 630 may provide stored data according to a request from the control unit 620.

Referring to FIG. 6, the service providing apparatus 600 may include a communication unit 610, a control unit 620, and a storage unit 630. In various embodiments of the present invention, the components described in FIG. 6 are not required, so the service providing apparatus 600 may be implemented to have components which are more than the components described in FIG. 6 or less therethan.

The above description just illustrates the technical spirit of the present invention and various changes and modifications can be made by those skilled in the art without departing from an essential characteristic of the present invention.

Various embodiments disclosed herein may be performed regardless of the order, and may be performed simultaneously or separately.

In an exemplary embodiment, at least one step may be omitted or added in each drawing and Detailed Description of Invention described herein, or performed in a reverse order or performed simultaneously.

The exemplary embodiments disclosed herein are provided for illustrative purposes only but not intended to limit the technical spirit of the present invention. The scope of the present invention is not limited to the exemplary embodiments The protective scope of the present invention should be construed based on the following claims, and all the technical concepts in the equivalent scope thereof should be construed as falling within the scope of the present invention.

What is claimed is:

1. A method for providing services in a virtual desktop environment, the method comprising:
    (a) receiving a virtual desktop infrastructure (VDI) service request for a VDI infrastructure;
    (b) determining component information of a basic VDI image in response to the VDI service request;
    (c) when license common utilization for an external service is available, generating a VDI instance in which a common utilization instance flag for the external service is set;
    (d) adding the VDI instance to a common utilization instance pool, which is accessible by a plurality of user terminals, and waiting for a VDI service access from a particular user terminal;
    (e) identifying that an instance flag of the VDI instance is the common utilization instance flag when the VDI service access of the particular user terminal is terminated;
    (f) returning the VDI instance to the common utilization instance pool according to the identification;
    (g) determining whether a license valid time of the VDI instance is smaller than a threshold;
    (h) when the license valid time of the VDI instance is larger than the threshold, waiting for the VDI service access of the particular user terminal by adding the VDI instance to the common utilization instance pool;
    (i) when the license valid time of the VDI instance is smaller than the threshold, terminating the VDI instance by shutting the VDI instance from the common utilization instance pool;
    (j) receiving external service related information associated with the basic VDI image from a content management system (CMS) server; and
    (k) generating a final VDI image for the VDI service by reflecting the component information and the external service related information to the basic VDI image.

2. The method for claim 1, further comprising:
    after step (a),
    performing a user login for a VDI platform for the VDI service in response to the VDI service request;
    loading VDI setting related information predetermined by a user in response to the user login; and
    loading external service related information according to the VDI setting related information.

3. The method for claim 2, further comprising:
    after step (a),
    performing an authentication of the user for an external service by using service access related information included in the external service related information.

4. The method for claim 1, further comprising:
    after step (k),
    generating a VDI instance for the VDI service by using the final VDI image.

5. An apparatus for providing services in a virtual desktop environment, the apparatus comprising:
    a communication unit receiving a virtual desktop infrastructure (VDI) service request for a VDI; and
    a control unit determining component information of a basic VDI image in response to the VDI service request,
    wherein the communication unit receives external service related information associated with the basic VDI image from a content management system (CMS) server,
    the control unit generates a final VDI image for the VDI service by reflecting the component information and the external service related information to the basic VDI image, generates, when license common utilization for an external service is available, a VDI instance in which a common utilization instance flag for the external service is set, and adds the VDI instance to a common utilization instance pool, which is accessible by a plurality of user terminals, and waits for a VDI service access from a particular user terminal, and
    wherein the control unit
    identifies that an instance flag of the VDI instance is the common utilization instance flag as the VDI service access of the particular user terminal is terminated,
    returns the VDI instance to the common utilization instance pool according to the identification,
    determines whether a license valid time of the VDI instance is smaller than a threshold,
    waits for the VDI service access of the particular user terminal by adding the VDI instance to the common utilization instance pool when the license valid time of the VDI instance is larger than the threshold, and
    terminates the VDI instance by shutting the VDI instance from the common utilization instance pool when the license valid time of the VDI instance is smaller than the threshold.

6. The apparatus of claim 5, wherein the control unit
    performs a user login for a VDI platform for the VDI service in response to the VDI service request,
    loads VDI setting related information predetermined by a user in response to the user login, and
    loads external service related information according to the VDI setting related information.

7. The apparatus of claim 6, wherein the control unit performs an authentication of the user for an external service by using service access related information included in the external service related information.

8. The apparatus of claim 5, wherein the control unit generates a VDI instance for the VDI service by using the final VDI image.

* * * * *